United States Patent
Kajiwara et al.

(10) Patent No.: US 6,307,360 B1
(45) Date of Patent: Oct. 23, 2001

(54) SWITCHING REGULATOR DC/DC CONVERTER, AND LSI SYSTEM PROVIDED WITH SWITCHING REGULATOR

(75) Inventors: Jun Kajiwara, Kyoto; Shiro Sakiyama, Osaka; Masayoshi Kinoshita, Osaka; Katsuji Satomi, Osaka; Katsuhiro Ootani, Nara, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/673,851

(22) PCT Filed: Feb. 23, 2000

(86) PCT No.: PCT/JP00/01012

§ 371 Date: Oct. 23, 2000

§ 102(e) Date: Oct. 23, 2000

(87) PCT Pub. No.: WO00/51226

PCT Pub. Date: Aug. 31, 2000

(30) Foreign Application Priority Data

Feb. 23, 1999 (JP) .................................................. 11-044159

(51) Int. Cl.$^7$ .................................................. G05F 1/563
(52) U.S. Cl. .......................................................... 323/282
(58) Field of Search .................................... 323/282, 283, 323/284, 285, 287, 222

(56) References Cited

U.S. PATENT DOCUMENTS

| | | | |
|---|---|---|---|
| 5,247,239 | 9/1993 | Yamamura et al. . | |
| 5,414,341 | * 5/1995 | Brown | 323/268 |
| 5,481,178 | 1/1996 | Wilcox et al. . | |
| 5,570,277 | 10/1996 | Ito et al. . | |
| 5,638,264 | 6/1997 | Hayashi et al. . | |
| 5,774,319 | 6/1998 | Carter et al. . | |
| 5,929,615 | 7/1999 | D'Angelo et al. . | |
| 6,057,675 | * 5/2000 | Tateishi | 323/283 |
| 6,064,187 | * 5/2000 | Redl et al. | 323/285 |
| 6,160,388 | * 12/2000 | Skelton et al. | 323/282 |
| 6,188,206 | * 2/2001 | Nguyen et al. | 323/222 |

FOREIGN PATENT DOCUMENTS

| | | |
|---|---|---|
| 61-254069 | 11/1986 | (JP) . |
| 10-174286 | 6/1998 | (JP) . |
| 10-215567 | 8/1998 | (JP) . |
| 10-323026 | 12/1998 | (JP) . |

* cited by examiner

*Primary Examiner*—Adolf Deneke Berhane
(74) *Attorney, Agent, or Firm*—Eric J. Robinson; Nixon Peabody LLP

(57) ABSTRACT

The switching regulator of a synchronous rectifying mode comprises the first and second switches SW1, SW2 arranged in series between the power source Vdd and the ground Vss, the switch control unit 1 which controls the on-off operation of the switches SW1, SW2, and the smoothing circuit 4 which smoothes the output node potential Vnd. When the signal Sc1 indicates that the output node potential Vnd goes below the first reference potential Vr1 which is the reference to detect the occurrence of the inrush current while the first switch SW1 is in the ON state, the control circuit 10 turns off the first switch SW1. Thus, the detection of the inrush current is conducted by making use of a voltage drop due to the on resistance of the first switch SW1, so that it is unnecessary to provide a resistance element for detecting the inrush current.

9 Claims, 14 Drawing Sheets

SWITCHING REGULATOR DC/DC CONVERTER, AND LSI SYSTEM PROVIDED WITH SWITCHING REGULATOR

TECHNICAL FIELD

The present invention relates to a technique in a switching regulator to detect and restrain inrush current at turn-on or in the initial operation, or excessive current caused at a short-circuit failure in the capacity for smoothing the output voltage.

BACKGROUND ART

Generally, in a switching regulator which converts a DC power-supply voltage into another DC voltage, the restraint of inrush current or excessive current has been one of the significant challenges. Here, the inrush current refers to the current that flows abruptly to charge the capacity for smoothing the output voltage when a switch connected to the power source is turned on in the initial operation such as at power-on. The excessive current, on the other hand, refers to the current that flows excessively from the power source towards the load when the switch connected to the power source is in the ON state. Without restraining the inrush current and the excessive current, the current flowing through the inductor within the smoothing circuit would exceed the maximum rating value, thereby causing the deterioration of the performance or even a breakage. It must be noted that in the present specification the inrush current and the excessive current are collectively called inrush current except for the case where it might be misleading.

In order to restrain the inrush current, the following circuit structure has been suggested.

FIG. 11 shows an example of the circuit structure of a conventional switching regulator. In this example, an inrush current detection circuit 50 includes a resistance element 51 for inrush current detection and an inrush current detector 52 which detects the presence or absence of the inrush current by means of the voltage across the resistance element 51. The inrush current detector 52 places the switching element 53 with a small on resistance in the ON state in a steady operation, and turns the element 53 off to flow the current to a resistance element 54 for inrush current restraint upon the inrush current detection. The resistance element 54 for inrush current restraint is composed of a resistor with a large resistance value or a temperature fuse resistor which interrupts a current flow in response to overheating (Refer to Japanese Laid-Open Patent Application No. 9-121546).

FIG. 12 shows another example of the circuit structure of the conventional switching regulator, which controls the switching pulse width variably with a sawtooth wave in the initial operation. Under the direction of a switch control circuit 57, a selector 56 selects and outputs the sawtooth wave in the initial operation and a reference potential in the steady operation. Consequently, as shown in FIG. 13, early in the initial operation, the on signal of the p-type MOS transistor switch SW1 has a short pulse width due to the comparison between the sawtooth wave and the output voltage Vout, and later the pulse width becomes gradually longer with increasing output voltage Vout. As a result, the inrush current in the initial operation is successfully restrained.

FIG. 14 shows a further another example of the circuit structure of the switching regulator which restrains the inrush current in the initial operation by means of a sawtooth wave in the same manner as in FIG. 12. In the structure shown in FIG. 14, the on-off control of switching elements 61, 62 are done by using a loop 1 in the initial operation and a loop 2 in the steady operation. A sawtooth wave generating circuit 63 generates a sawtooth wave STW so as to perform the initializing operation while gradually changing the switching on-off duty, thereby restraining the inrush current in the initial operation (Refer to Japanese Laid-Open Application No. 5-56636).

Problems to be Solved

However, the conventional switching regulator with the above-described structures has the following problems.

The structure with the inrush current restraint circuit shown in FIG. 11 has a drawback of a low power conversion efficiency. To be more specific, the resistance element 51 for inrush current detection causes a resistance loss because it is interposed with a current path from the power source, and therefore, the power conversion efficiency of the switching regulator deteriorates.

As another drawback, the structures where the initial operation is performed with a sawtooth wave as shown in FIGS. 12 and 14, it is possible to restrain the inrush current in the initial operation; however, it is impossible to detect and restrain the excessive current in the steady operation. There is further another drawback of increasing the time required for the initialization. Moreover, there is a necessity to generate a signal that distinguishes between the initial operation and the steady operation due to the nature of the circuit structure.

DISCLOSURE OF THE INVENTION

The present invention has an object of providing a switching regulator which restrains the inrush current and the excessive current while maintaining a high power conversion efficiency and which requires a shorter time for initialization than conventional switching regulators.

To be more specific, a switching regulator of a synchronous rectifying mode of the present invention comprises: a first switch and a second switch arranged in series between a first power source which supplies a first potential and a second power source which supplies a second potential lower than the first potential, the first switch being positioned closer to the first power source than the second switch; a switch control unit for controlling an on-off operation of the first and second switches; and a smoothing circuit for smoothing a potential of an output node between the first switch and the second switch, said switch control unit turning off the first switch when the potential of said output node is below a first reference potential which becomes a reference to detect an occurrence of inrush current or excessive current while the first switch is in an ON state.

According to the present invention, when the potential of the output node goes below the first reference potential while the first switch is in the ON state, the first switch is turned off by regarding it as the occurrence of the inrush current or the excessive current. To be more specific, when the occurrence of the inrush current and the excessive current has been detected by making use of a voltage drop due to the on resistance of the first switch, the first switch is turned off so as to interrupt the inrush or excessive current. This approach can realize the detection of the inrush or excessive current without setting up a resistance element for detection or without causing a decrease in the power conversion efficiency of the switching regulator. Moreover, the initial operation does not need a different control from the steady operation, which makes it possible to restrain the inrush current in the initial operation and the excessive current in the steady operation in the same manner.

The switch control unit of the switching regulator of the present invention preferably comprises: a first reference potential generating circuit for generating the first reference potential; a first potential comparator for comparing the first reference potential generated by the first reference potential generating circuit with the potential of said output node; and an available period setting circuit for setting an available period during which the comparison results of the first potential comparator is valid. The switch control unit turns off the first switch when the first potential comparator detects that the potential of said output node is below the first reference potential during said available period set by said available period setting circuit.

It is also preferable that the available period setting circuit sets the start of said available period at a time when a predetermined time period has elapsed since the first switch is turned on.

It is further preferable that after turning off the first switch, said switch control unit places the second switch in the ON state for a predetermined time period before the first switch is turned back on.

Consequently, while the first switch is in the OFF state, the second switch can be placed in the ON state for a predetermined time period to flow a current from the second power source towards the smoothing circuit. Therefore, in the initial operation, the time required to boost the output voltage of the smoothing circuit to a preset voltage or the time required for initialization can be accelerated.

The predetermined time period is preferably set at a fixed time period. In addition, The predetermined time period is preferably set variable in accordance with an output voltage of said smoothing circuit.

It is also preferable that the switch control unit turns off the second switch when the potential of said output node exceeds a second reference potential which becomes the reference to determine the termination of the ON-time-period of the second switch while the second switch is in the ON state.

The LSI system of the present invention comprises: said switching regulator of claim 1 and an LSI core unit driven by a voltage supplied from said switching regulator.

The DC/DC converter of the present invention comprises: a first switch and a second switch arranged in series between a first power source which supplies a first potential and a second power source which supplies a second potential lower than the first potential, the first switch being positioned closer to the first power source than the second switch; and a switch control unit for controlling the on-off operation of the first and second switches. The switch control unit turns off the first switch when the potential of said output node is below a first reference potential which becomes the reference to detect the occurrence of inrush current or excessive current while the first switch is in the ON state.

BRIEF DESCRIPTION OF THE DRAWINGS

FIG. 3(a) shows the embodiment of the present invention and FIG. 3(b) shows the conventional structure.

BEST MODE FOR CARRYING OUT THE INVENTION

Figure 1:
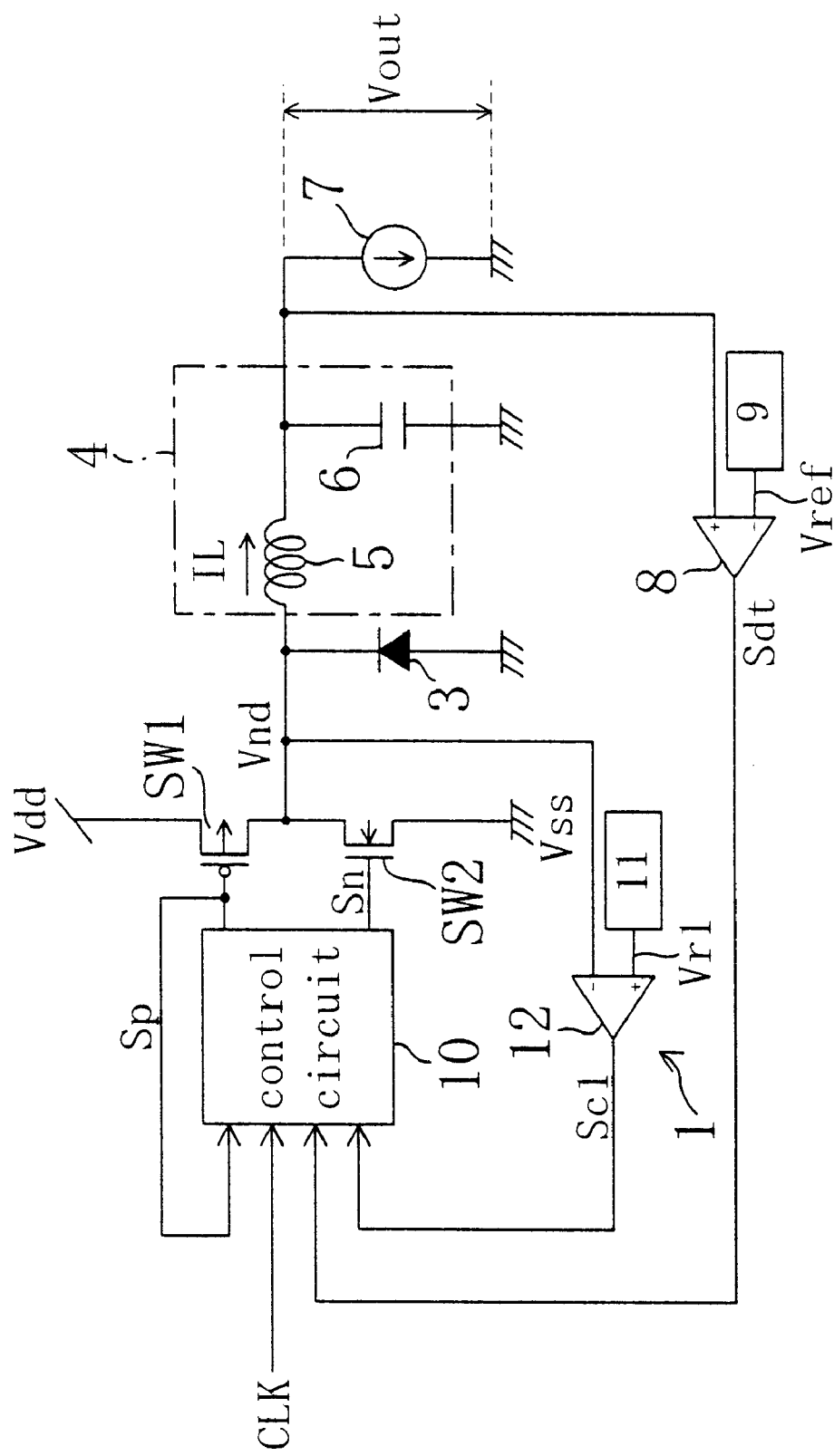
FIG. 1 shows the structure of the switching regulator of the embodiment of the present invention.

FIG. 1 shows the structure of the switching regulator of the embodiment of the present invention. The switching regulator comprises a first switch SW1 composed of a p-type MOS transistor and a second switch SW2 composed of an n-type MOS transistor which are arranged in series between a first power source (hereinafter referred to as power source Vdd) to supply power-supply voltage Vdd as the first potential and a second power source (hereinafter referred to as power source Vss) to supply a ground potential Vss as the second potential, a diode 3 which flows a current from the power source Vss when the first and second switches SW1, SW2 are both in the OFF state, and a smoothing circuit 4 which smoothes the potential Vnd of the output node between the first and second switches SW1 and SW2. The smoothing circuit 4 is composed of an inductor 5 and a capacity 6 for smoothing output voltage, and smoothes the potential Vnd which has shaped a rectangular wave as a result of the switching operation of the first and second switches SW1, SW2 into a constant voltage. The voltage smoothed by the smoothing circuit 4 is supplied to an output load 7 as the output voltage Vout.

The switching regulator further comprises a control circuit 10 which controls the switching operation of the first and second switches SW1 and SW2 using a first and second switching signals Sp and Sn, a first reference potential generating circuit 11 which generates a first reference potential Vr1 as the reference to detect inrush current, and a first potential comparator 12 which compares the first reference potential Vr1 generated by the first reference potential generating circuit 11 with the output node potential Vnd. The control circuit 10, the first reference potential generating circuit 11 and the first potential comparator 12 compose a switch control unit 1. The first and second switches SW1 and SW2, the switch control unit 1, the diode 3 and the smoothing circuit 4 compose the switching regulator of the present embodiment.

The feature of the present embodiment is to detect the presence or absence of the occurrence of inrush current by making use of a voltage drop due to the on resistance of the first switch SW1. The control circuit 10 basically controls the switching operation of the first and second switches SW1, SW2 based on a control signal Sdt indicating the results of the comparison between the output voltage Vout and a reference voltage Vref generated by a reference voltage generating circuit 9, and further controls inrush current restraint based on a first determination signal Sc1 outputted from the first potential comparator 12.

Figure 2:
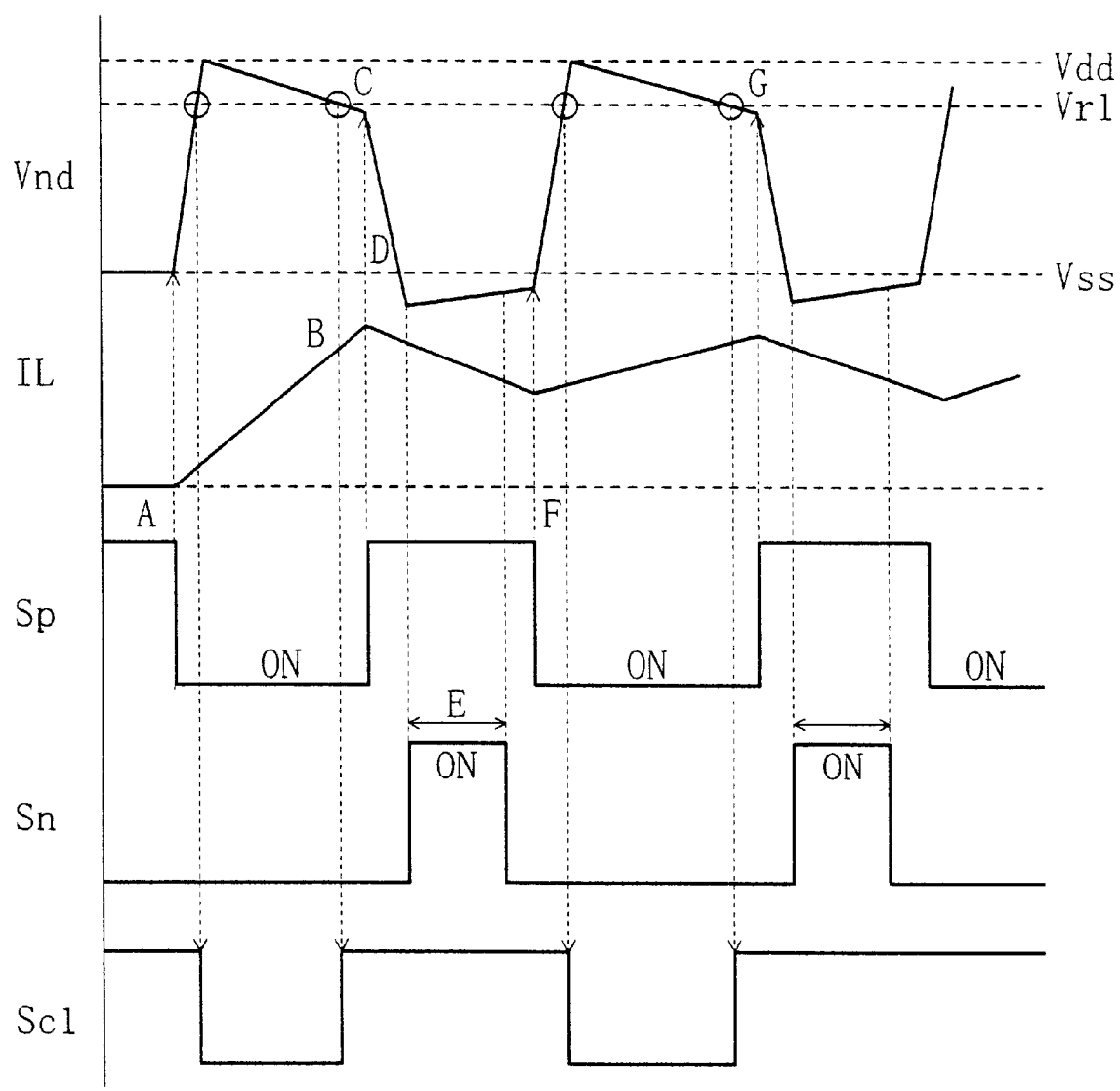
FIG. 2 shows the behavior of the switching regulator of FIG. 1.

The behavior of the switching regulator shown in FIG. 1 will be described as follows. First, the initial operation will be described with reference to FIG. 2. Assume that before the initial operation, the capacity 6 for smoothing output voltage is not charged.

First, the control circuit 10 makes the first switching signal Sp a low ("L") to turn on the first switch SW1 (A in FIG. 2), and as a result, a current flows from the power source Vdd towards the smoothing circuit 4 so as to start charging the capacity 6. At this moment, inrush current occurs (B in FIG. 2). The inrush current flows from the power source Vdd via the first switch SW1 so that due to the whole resistance component Rp existing from the power source Vdd to the output node including the on resistance of the first switch SW1, the output node potential Vnd drops from the power-supply voltage Vdd by a voltage Vdrop (C in FIG. 2) which is expressed as follows:

$$V\text{drop} = Rp \times I \quad (1)$$

In the formula (1), I represents the current value of the inrush current.

When the first determination signal Sc1 indicates that the output node potential Vnd goes below the first reference potential Vr1, or that the signal Sc1 becomes a high ("H") within a set available period (which will be detailed later), the control circuit 10 forcibly turns off the first switch SW1 on the assumption that the inrush current has exceeded the set limit.

Consequently, the output node potential Vnd suddenly drops below the ground potential Vss (D in FIG. 2) so as to turn on the diode 3, which in turn makes the current flow from the power source Vss towards the smoothing circuit 4. At this moment, in order to reduce a loss in the diode 3, the control circuit 10 places the second switch SW2 in the ON state for a predetermined time period (E in FIG. 2). As a result, the current IL flows less and less through the inductor 5. After turning off the second switch SW2, the control circuit 10 turns the first switch SW1 back on (F in FIG. 2). At this time, in the same manner as above, when the first determination signal Sc1 indicates that the output node potential Vnd goes below the first reference potential Vr1, or that the signal Sc1 becomes "H" within the available period (G in FIG. 2), the control circuit 10 turns off the switch SW1, and then places the second switch SW2 in the ON state for the predetermined time period.

By repeating these operations, the initializing operation can be performed with restrained inrush current.

In the steady operation, the control circuit 10 behaves as follows. The control signal Sdt indicating the results of the comparison between the output voltage Vout and the reference voltage Vref is fed back to the control circuit 10 where the first switch SW1 and the second switch SW2 are alternately turned on and off based on a PWM control system. Consequently, the output voltage Vout is kept constant. In this case as well, when the first determination signal Sc1 indicates that the output node potential Vnd goes below the first reference potential Vr1, the control circuit 10 turns off the first switch SW1 to restrain excessive current.

As described hereinbefore, according to the present embodiment, the inrush current can be detected and restrained without providing a resistance element, thereby making it possible to maintain high power conversion efficiency.

Figure 3A:
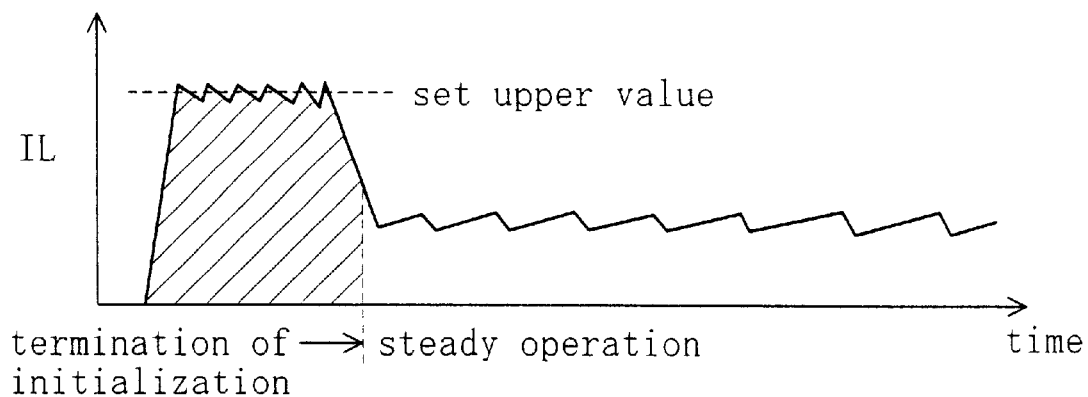
FIGS. 3(a) and 3(b) are graphs depicting a time-varying inductor current IL in the initial operation.
Figure 3B:
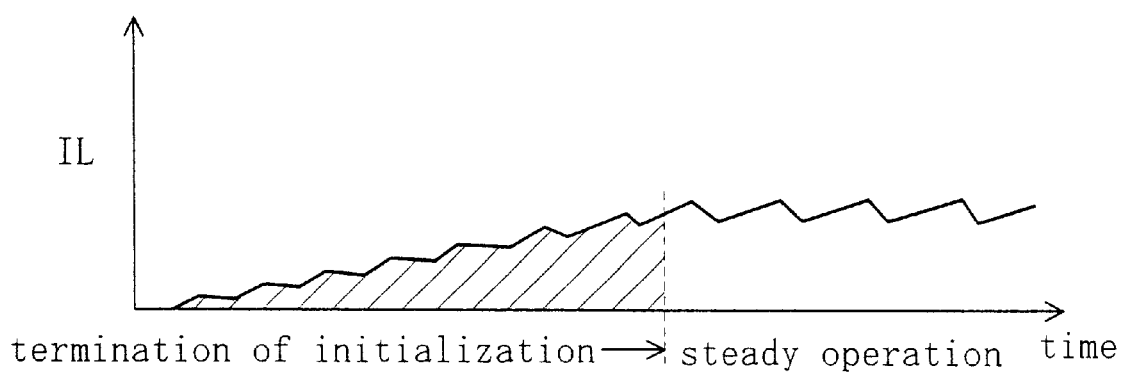
Figure 12:
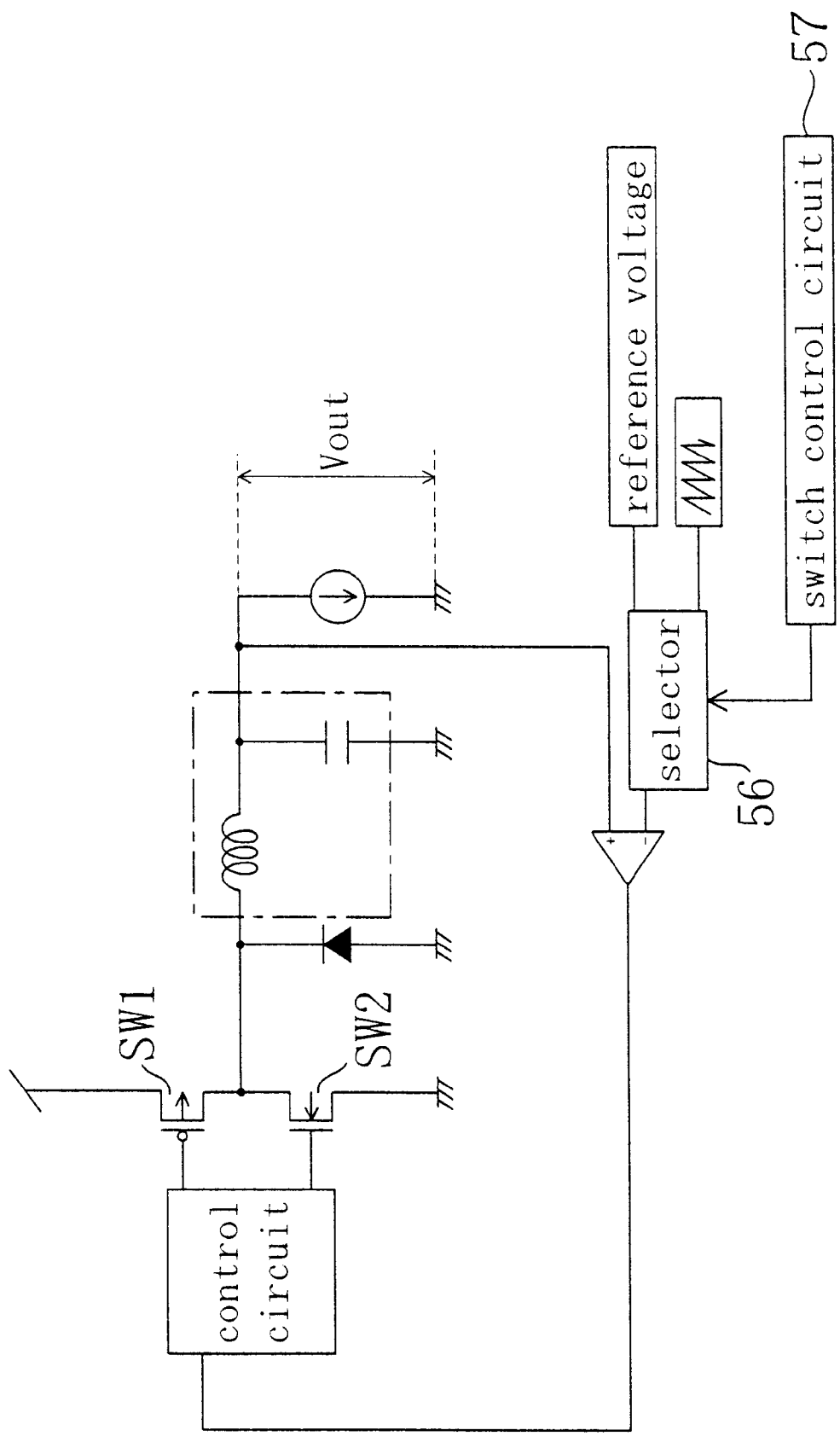
FIG. 12 shows another example of the circuit structure of the conventional switching regulator.
Figure 13:
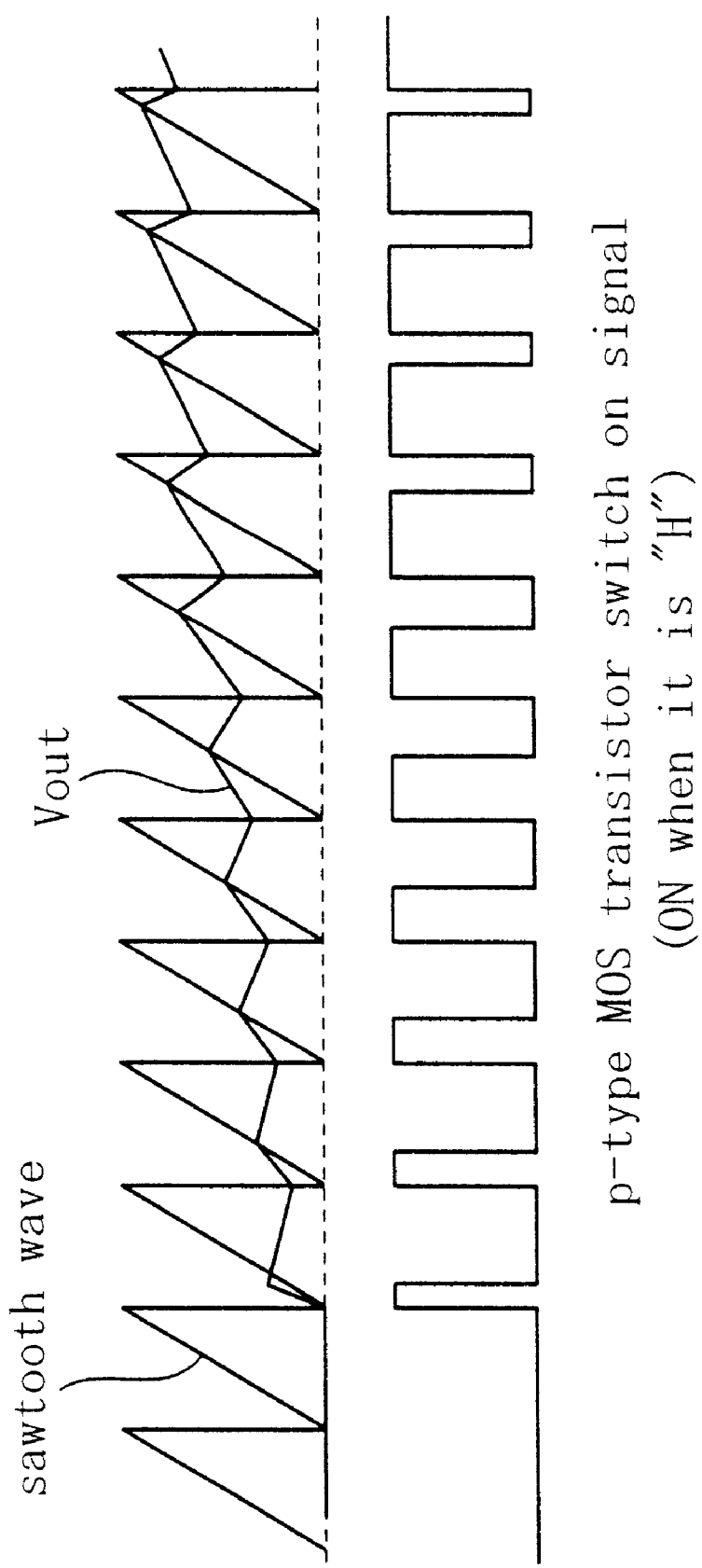
FIG. 13 shows the initial operation of the switching regulator of FIG. 12.
Figure 14:
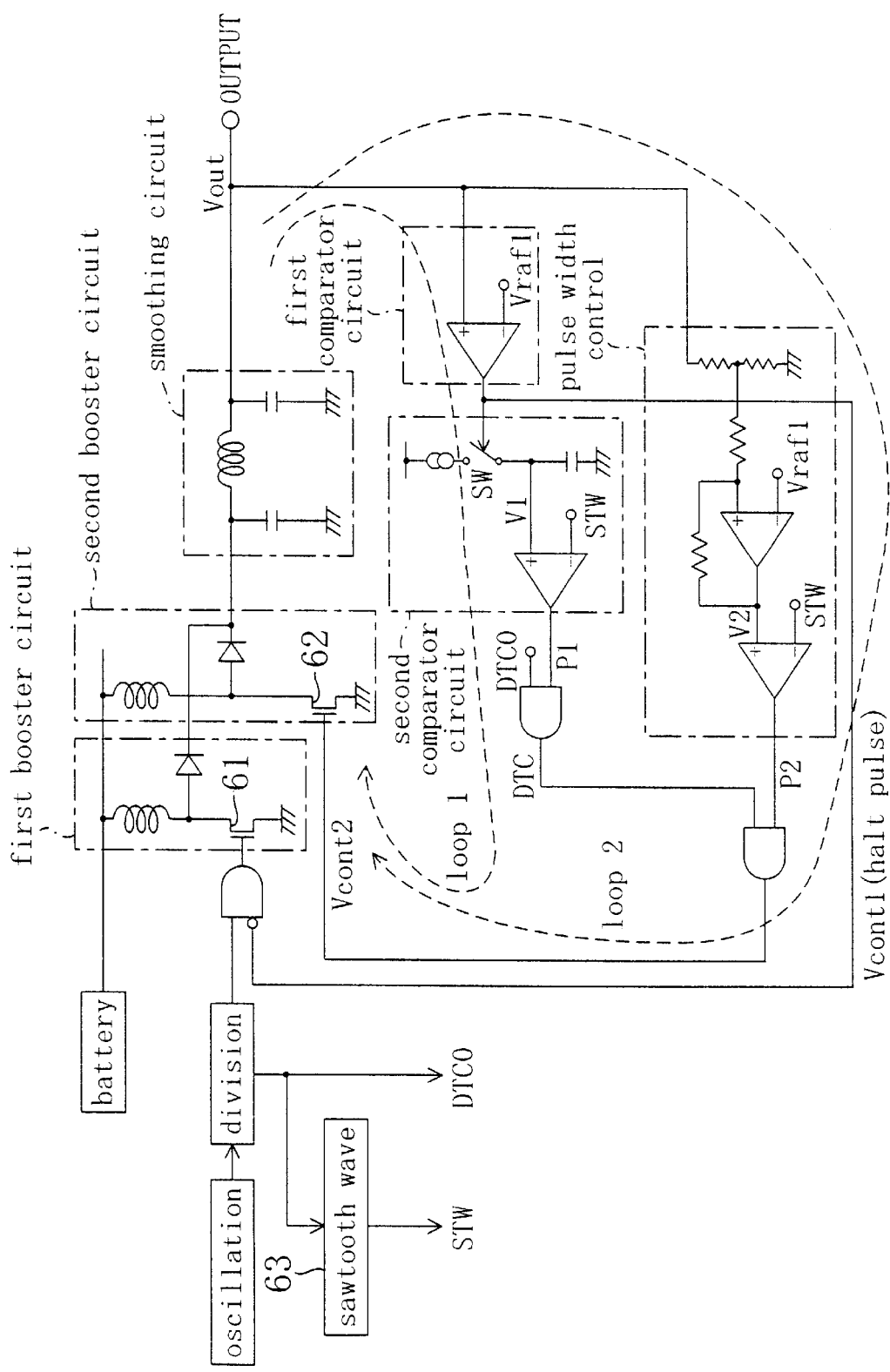
FIG. 14 shows further another example of the circuit structure of the conventional switching regulator.

In addition, the time required for the initialization is drastically reduced. FIGS. 3(a) and 3(b) are graphs showing the time-varying inductor current IL in the initial operation: FIG. 3(a) shows the present embodiment and FIG. 3(b) shows the conventional structures with the sawtooth wave as shown in FIGS. 12 and 14. As shown in FIG. 3(a), in the present embodiment, the initial operation can be performed while flowing the current IL through the inductor 5 nearly at the set upper limit value. The time required for the initialization, which is the time necessary to supply the amount of charge (corresponding to the diagonally shaded area in FIG. 3) to the capacity 6 for smoothing output voltage, can be greatly reduced in the present embodiment as is shown in FIG. 3.

Figure 4:
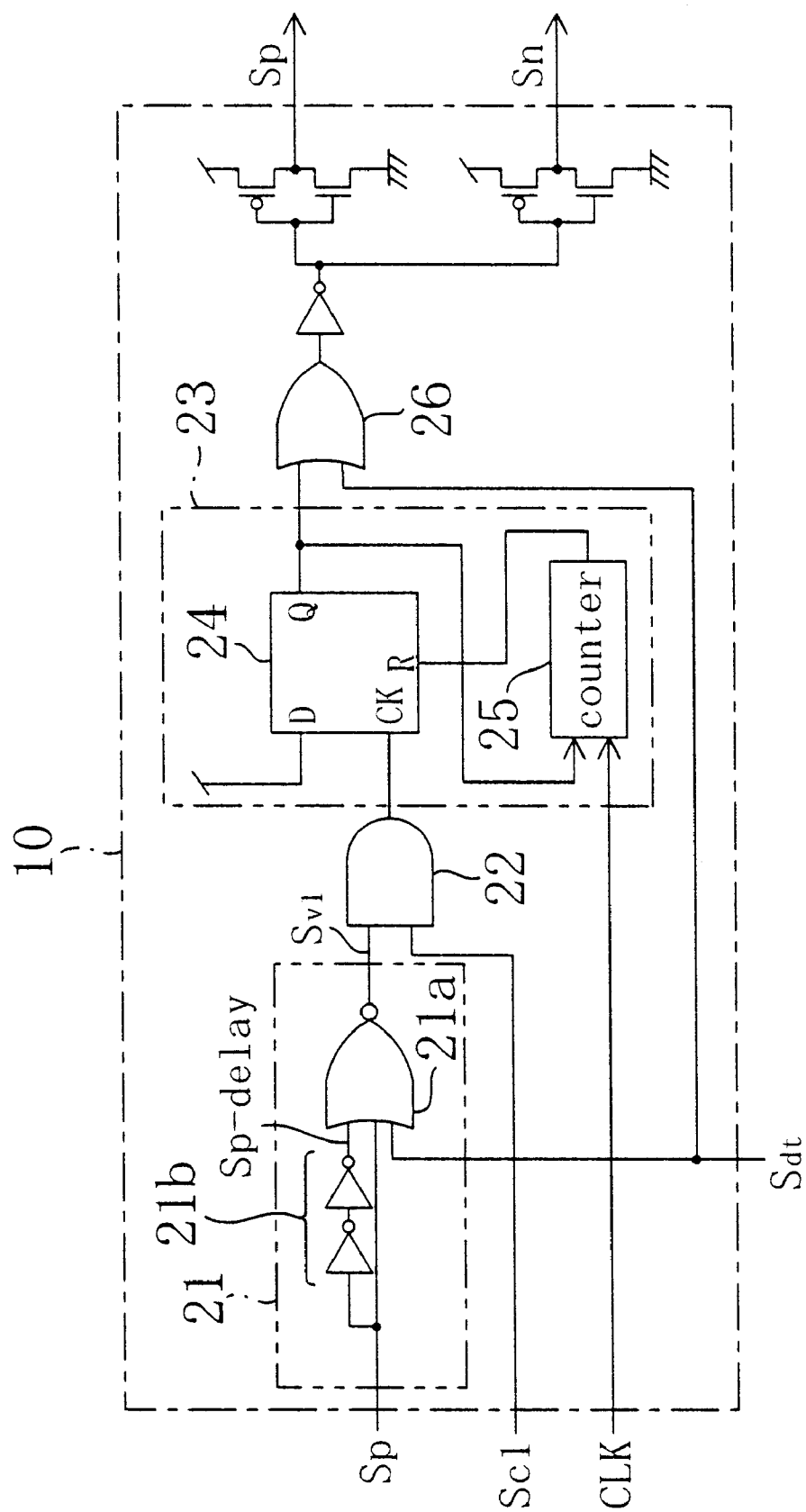
FIG. 4 shows the internal structure of the control circuit of the switching regulator shown of FIG. 1.

FIG. 4 shows the internal structure of the control circuit 10. The control circuit 10 comprises an available period setting circuit 21 which sets the available period of the first determination signal Sc1 and an ON-time-period setting circuit 23 which sets the ON-time-period of the second switch SW2.

In the steady operation, the output signal of the ON-time-period setting circuit 23 remains "L", and the output signal of the OR gate 26 becomes equal to the control signal Sdt. In other words, when there is no occurrence of inrush current, the control circuit 10 controls the switching operation of the first and second switches SW1 and SW2 according to the control signal Sdt.

An available period signal Sv1 outputted from the available period setting circuit 21 becomes "H" only when the inputs of a NOR gate 21a are all lows. To be more specific, the available period signal Sv1 becomes "H" by lagging only behind a signal propagation time of the inverter 21b after the first switching signal Sp becomes "L", and becomes "L" when the first switching signal Sp becomes "H". The available period is when the available period signal Sv1 is "H". When the control signal Sc1 becomes "H" while the signal Sv1 is "H", the output of the AND gate 22 becomes "H". When the output of the AND gate 22 becomes "H", the ON-time-period setting circuit 23 makes its output "H" for the time period set by the counter 25. As a result, regardless of the logical level of the control signal Sdt, the output signal of the OR gate 26 becomes "H" for a fixed time period, thereby placing the second switch SW2 in the ON state for the fixed time period.

(Setting the Available Period)

Figure 5:
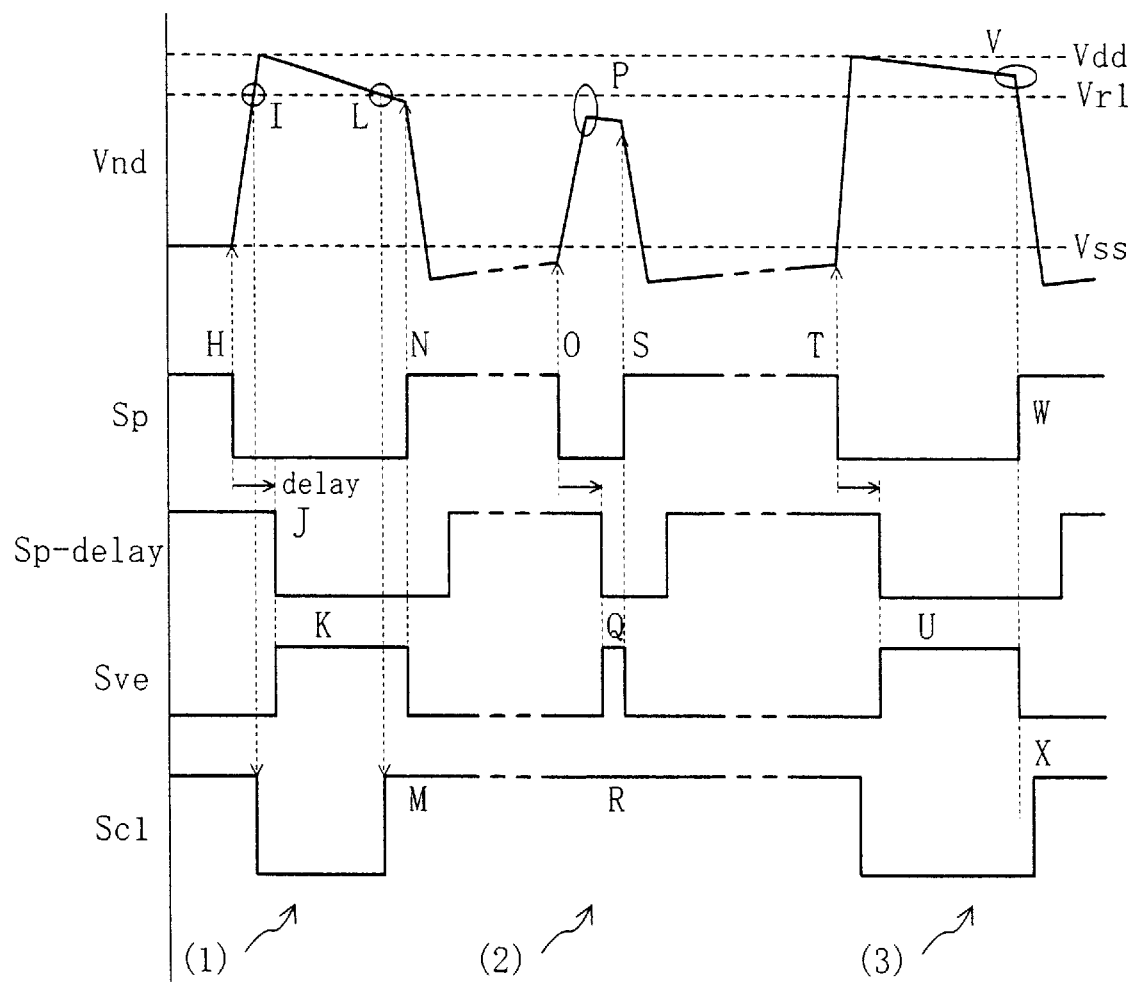
FIG. 5 shows the behavior of the switching regulator of FIG. 1 and explains the setting of the available period.

FIG. 5 shows the behavior of the switching regulator of FIG. 1 and explains the setting of the available period during which the first determination signal Sc1 is valid. In FIG. 5, (1) and (2) indicate the voltage and signal waveforms when inrush current occurs, while (3) indicates the voltage and signal waveforms when no inrush current occurs.

First, the case of (1) will be described as follows. The control circuit 10 makes the first switching signal Sp "L" to place the first switch SW1 in the ON state (H in FIG. 5). Consequently, the output node potential Vnd grows to reach the power-supply potential Vdd, during which the potential Vnd exceeds the first reference potential Vr1 (I in FIG. 5) to make the first determination signal Sc1 "L". On the other hand, the delay signal Sp-delay of the first switching signal Sp becomes "L" by lagging only behind the signal propagation time of the two inverters 21b (J in FIG. 5). As a result, the available period signal Sve becomes "H" with a delay time corresponding to the signal propagation time of the two inverters 21b after the first switching signal Sp becomes "L".

The time required for the output node potential Vnd to exceed the first reference potential Vr1 depends on the load current value, or the charge status of the capacity 6, that is, the output voltage Vout. Therefore, the delay time of the available period signal Sve must be set long enough to secure that the output node potential Vnd exceeds the first reference potential Vr1 by the start of the available period.

When the inrush current flows while the available period signal Sve is "H" (K in FIG. 5) to make the output node potential Vnd go below the first reference potential Vr1 (L in FIG. 5), the first determination signal Sc1 becomes "H" (M in FIG. 5), and the control circuit 10 forces the first switching signal Sp to be "H" so as to turn off the first switch SW1 (N in FIG. 5). As a result of the first switch SW1 having been turned off, the available period signal Sve immediately becomes "L" to terminate the available period.

The case of (2) will be described as follows. The control circuit 10 makes the first switching signal Sp "L" to turn on the first switch SW1 (O in FIG. 5). Consequently, the output node potential Vnd increases; however, when the inrush or excessive current is already flowing, the output node potential Vnd does not reach the first reference potential Vr1 (P in FIG. 5). At this time, the control circuit 10 immediately turns off the first switch SW1 because the first determination signal Sc1 remains to be "H" (R in FIG. 5) when the available period signal Sve becomes "H" (Q in FIG. 5). Since the first switch SW1 is in the ON state only during the signal propagation time of the two inverters 21b after the first switching signal Sp becomes "L", the first reference potential Vr1 must be set with some margins by taking the inrush current which flows during this time period into account.

The case of (3) will be described as follows. In the same manner as the cases of (1) and (2), the control circuit 10 makes the first switching signal Sp "L" to turn on the first switch SW1 (T in FIG. 5). As a result, the output node potential Vnd grows to reach the power-supply potential Vdd. In this process, the output node potential Vnd exceeds the first reference potential Vr1, and the determination signal Sc1 becomes "L". Later, the available period signal Sve becomes "H" (U in FIG. 5). However, in the steady operation where no inrush occurs, the output node potential Vnd does not go below the first reference potential Vr1 (V in FIG. 5), so that the first determination signal Sc1 remains "L". The control circuit 10 makes the first switching signal Sp "H" in accordance with the control signal Sdt to turn off the first switch SW1 (W in FIG. 5). Accordingly, the available period signal Sve also becomes "L" immediately. Later, even when the first determination signal Sc1 becomes "H" (X in FIG. 5), the switching regulator can continue the steady operation because the available period signal Sve is "L".

Thus, providing the available period realizes the detection of both the inrush current in the initial operation and the excessive current in the steady operation.

(Setting of the ON-time-period of the Second Switch SW2)

When the ON-time-period of the second switch SW2 is too long, the current IL flows less and less through the inductor 5 and finally flows in the reverse direction. This prevents the output voltage Vout from growing, which results in the extension of the time required for the initialization.

On the other hand, if the ON-time-period of the second switch SW2 is too short, when the first switch SW1 is turned on next time, the current IL flowing through the inductor 5 is sufficiently large, so that the first switch SW1 must be turned off immediately as shown in (2) in FIG. 5. Therefore, the first reference potential Vr1 must be provided with enough margins by taking the inrush current flowing during the ON-time-period into consideration. Moreover, the next ON-time-period of the first switch SW1 also becomes short, so that the switching period becomes short, making the resultant charge-discharge loss not negligible. Thus, the ON-time-period of the second switch SW2 is a very important factor to the time required for the initialization and to the efficiency.

Therefore, in the present embodiment, the ON-time-period of the second switch SW2 is set as follows. The rate of decrease in the current IL flowing through the inductor 5 in the ON-time-period of the second switch SW2 depends on the voltage across the inductor 5 or the difference between the output node potential Vnd and the output voltage Vout (approximately corresponding to the output voltage Vout). In view of this, when the output voltage Vout is low, a certain time period during which the current IL flowing through the inductor 5 fully falls is set as the ON-time-period of the second switch SW2. To be more specific, the ON-time-period is set as the time required to sufficiently decrease the amount of the current IL flowing through the inductor 5 to the value which allows the output node potential Vnd to exceed the first reference potential Vr1 when the first switch SW1 is turned back on.

Alternatively, the ON-time-period of the second switch SW2 can be set to be variable in accordance with the output voltage Vout.

The rate of decrease in the current IL flowing through the inductor 5 when the second switch SW2 is in the ON state is small when the output voltage Vout is low, and large when it is high. Judging from this, in the initial operation, it is preferable that when the output voltage Vout is low, the ON-time-period of the second switch SW2 should be set long and made gradually shorter with the output voltage Vout increasing. The ON-time-period of the second switch SW2 at the beginning of the initial operation can be set in the above-mentioned time period. Setting the ON-time-period of the second switch SW2 variable like this in accordance with the output voltage Vout achieves the reduction of the time required for the initialization.

Figure 6:
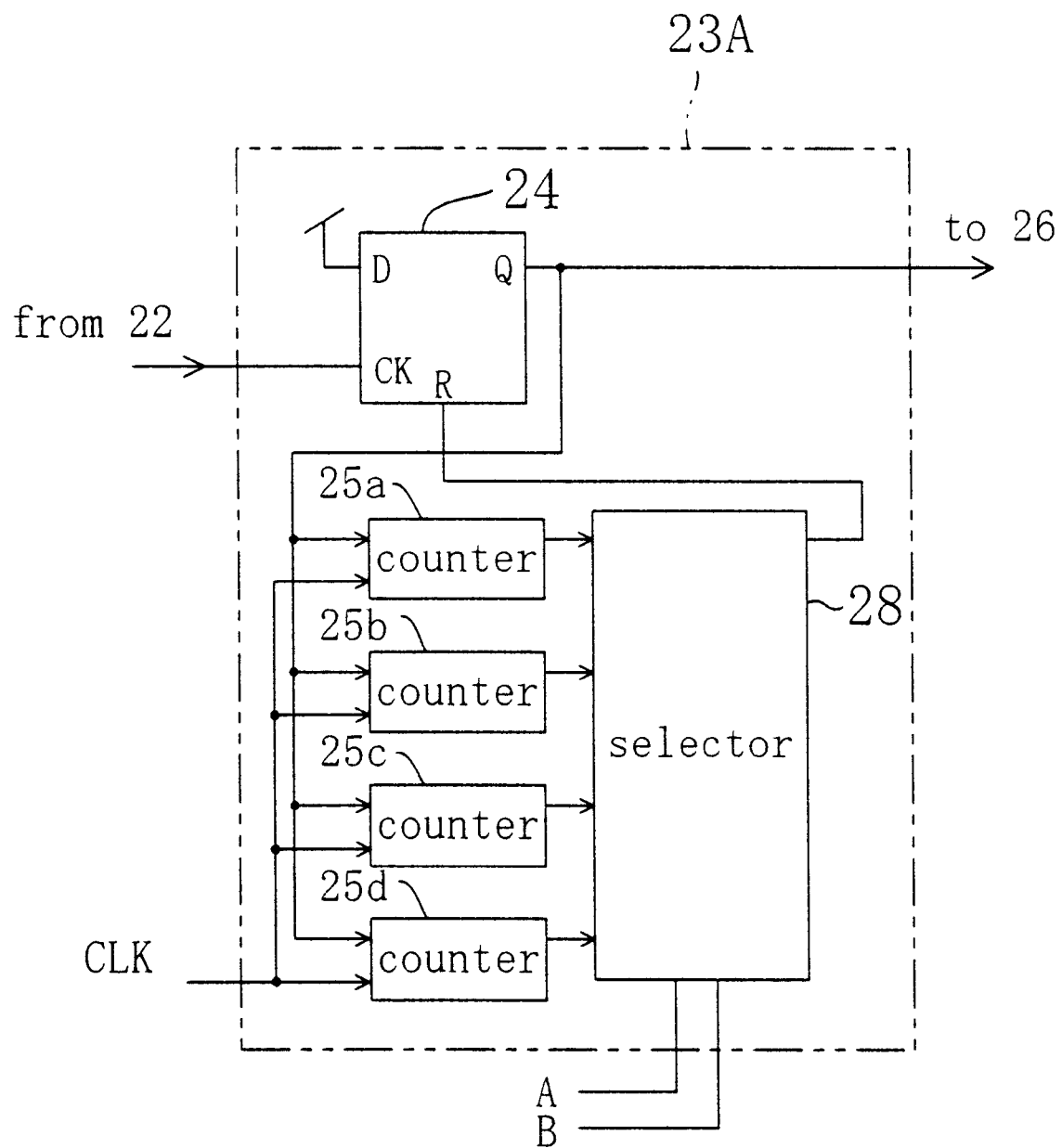
FIG. 6 shows another circuit structure of the ON-time-period setting circuit in the control circuit of FIG. 5.

FIG. 6 shows the circuit structure of the ON-time-period setting circuit to realize the above-mentioned control. The ON-time-period setting circuit 23A shown in FIG. 6 comprises four counters 25a to 25d to which four different ON-time-periods such as 4 $\mu$s, 3 $\mu$s, 2 $\mu$s and 1 $\mu$s can be set respectively. The values of signals A and B can be set as shown in Table 1 below according to the output voltage Vout.

TABLE 1

| Vout | A | B | ON-time-period |
|---|---|---|---|
| 0~500 mV | L | L | 4 $\mu$S |
| 500~1 V | H | L | 3 $\mu$S |
| 1 V~2 V | L | H | 2 $\mu$S |
| 2 V~ | H | H | 1 $\mu$s |

(A Modified Example of the Embodiment)

Figure 7:
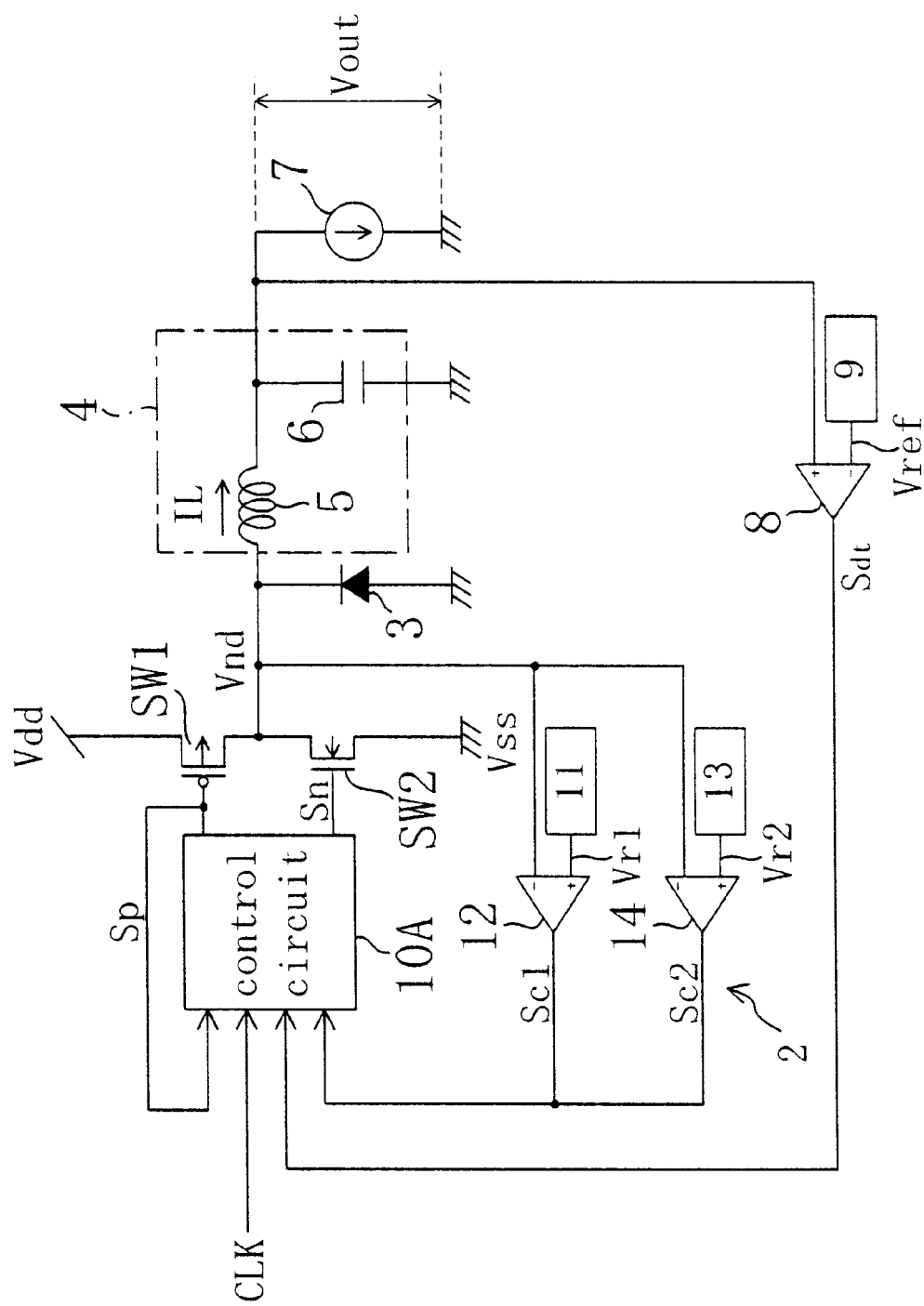
FIG. 7 shows a modified example of the circuit structure of the switching regulator of FIG. 1.

FIG. 7 shows the circuit structure of a modified example of the switching regulator of the present embodiment. In FIG. 7, like components are labeled with like reference numerals with respect to FIG. 1. The switching regulator comprises a second reference potential generating circuit 13 which generates a second reference potential Vr2 as the reference to determine the termination of the ON-time-period of the second switch SW2 and a second potential comparator circuit 14 which compares the output node potential Vnd with the second reference potential Vr2. A switch control unit 2 is composed of a control circuit 10A, the first and second reference potential generating circuits 11, 13 and the first and second potential comparator circuits 12, 14.

The feature of the modified example is to place the second switch SW2 in the ON state until the output node potential Vnd reaches the second reference potential Vr2, instead of previously setting the ON-time-period of the second switch SW2 at a predetermined time period. The control circuit 10A basically controls the switching operation of the first and second switches SW1 and SW2, based on the control signal Sdt indicating the results of the comparison between the output voltage Vout and the reference voltage Vref generated by the reference voltage generating circuit 9. The control circuit 10A further controls the restraint of the inrush current based on the first determination signal Sc1 outputted from the first potential comparator 12 and sets the termination of the ON-time-period of the second switch SW2 based on the second determination signal Sc2 outputted from the second potential comparator 14.

Figure 8:
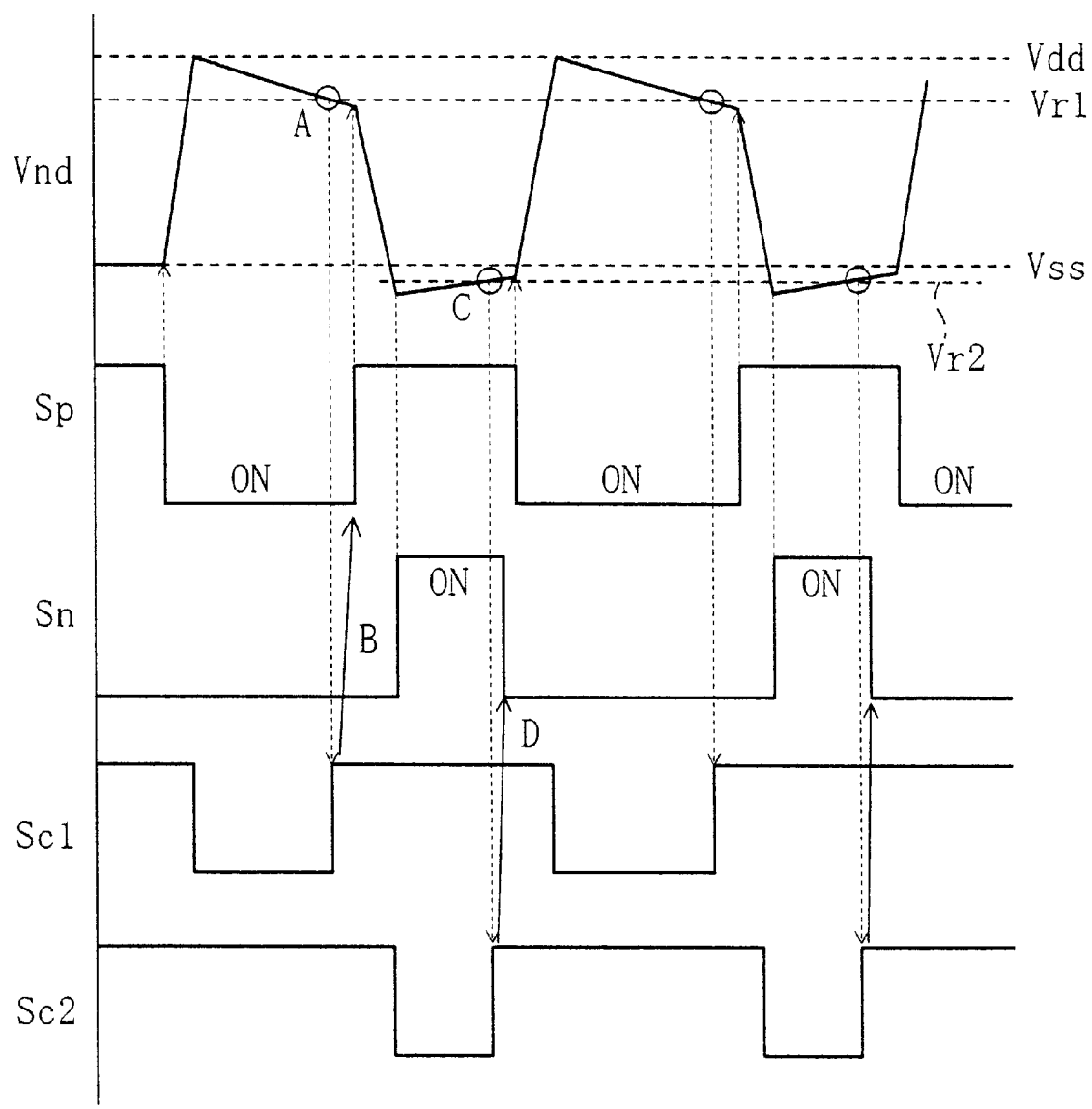
FIG. 8 shows the behavior of the switching regulator of FIG. 7.

The behavior of the switching regulator shown in FIG. 7 will be described as follows with reference to FIG. 8. When the inrush current or the excessive current flows to make the output node potential Vnd go below the first reference potential Vr1 within the available period (A in FIG. 8), the control circuit 10A detects that the first determination signal Sc1 is "H" and makes the first switching signal Sp "H" to turn off the first switch SW1 (B shown in FIG. 8). Later, the control circuit 10A makes the second switching signal Sn "H" so as to turn on the second switch SW2, but the ON-time-period is not set in advance. When the output node potential Vnd exceeds the second reference potential Vr2 (C in FIG. 8), the second determination signal Sc2 becomes "H", and the control circuit 10A detects that the second determination signal Sc2 is "H" and makes the second switching signal Sn "L" so as to turn off the second switch SW2 (D in FIG. 8).

In order to quicken the initial operation of the switching regulator, it is preferable that the ON-time-period of the second switch SW2 is as long as possible within a range where the output node potential Vnd does not exceed the ground potential Vss. Therefore, as in this modified example, the termination of the ON-time-period of the second switch SW2 can be determined by the comparison between the output node potential Vnd and the second reference potential Vr1 so as to reduce the time required for the initialization, while inrush current being restrained.

It goes without saying that the inrush current or the excessive current can be restrained both in the initial operation and in the steady operation.

Figure 9:
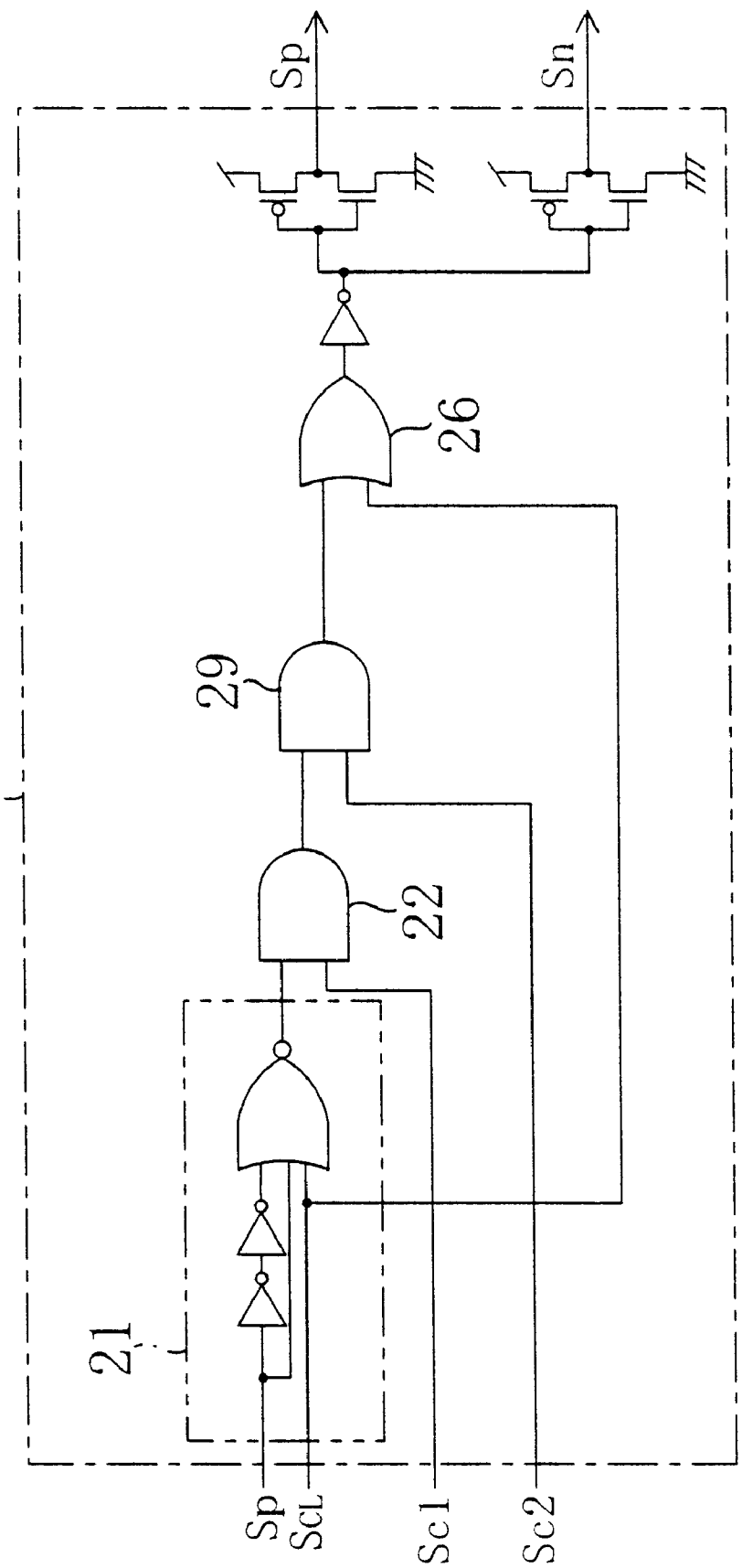
FIG. 9 shows the internal structure of the control circuit of the switching regulator of FIG. 7.

FIG. 9 shows the circuit structure of the control circuit 10A of FIG. 7. In FIG. 9, like components are labeled with like reference numerals with respect to FIG. 4 showing the circuit structure of the control circuit 10 of FIG. 1. In FIG. 9, the ON-time-period setting circuit 23 of FIG. 4 is replaced by a 2-input NAND gate 29 which enters the second determination signal Sc2 and the output signal of the NAND gate 22.

In the above-mentioned embodiment or the modified example, the first reference potential Vr1 may be so structured that the setting is changeable. This can extend the range of choices of the inductor 5 in the smoothing circuit 4 and improve the flexibility of design in the system. It is also possible to make the second reference potential Vr2 changeable in setting.

Figure 10:
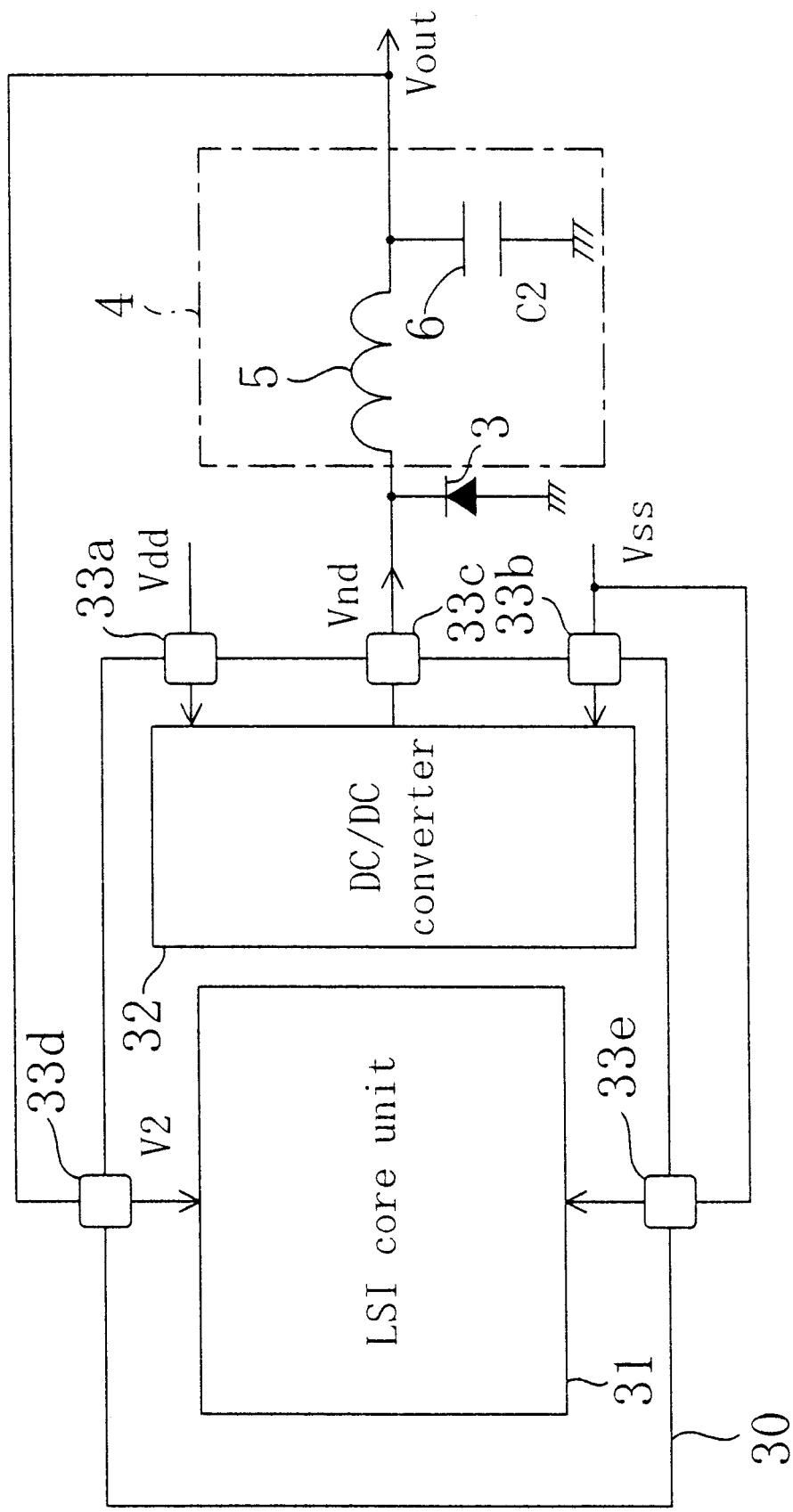
FIG. 10 shows an example of an LSI system provided with the switching regulator of the present invention.
Figure 11:
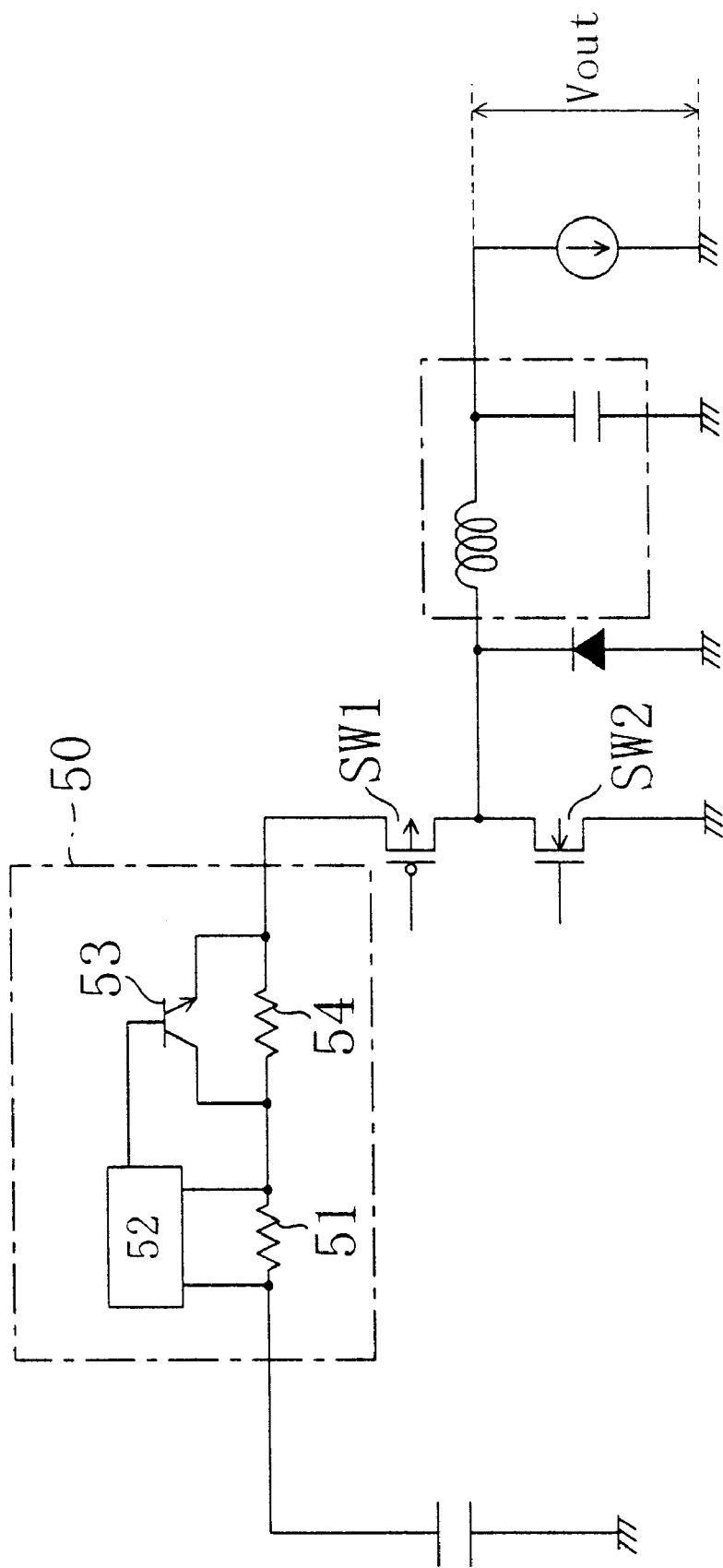
FIG. 11 shows an example of the circuit structure of the conventional switching regulator.

FIG. 10 shows an example of the LSI system provided with the switching regulator of the present invention. The LSI 30 comprises an LSI core unit 31 and a DC/DC converter 32, and further comprises a diode 3 and a smoothing circuit 4 as external components. There are also pads 33a to 33c. The DC/DC converter 32 comprises the first and second switches SW1 SW2 and the switch control unit 1 or 2 shown in the above-mentioned embodiment or the modified example. The switching regulator of the present invention is composed of the DC/DC converter 32, the diode 3 and the smoothing circuit 4. The DC/DC converter 32 converts the power-supply potentials Vdd, Vss supplied to the pads 33a, 33b into the voltage Vnd through the behavior of the above-mentioned embodiment or the modified example to output it to the pad 33c. The smoothing circuit 4 smoothes the output voltage Vnd of the DC/DC converter 32 and outputs it as the voltage Vout. The output voltage Vout of the smoothing circuit 4 is supplied as the internal power-supply voltage of the LSI core unit 31.

As described hereinbefore, according to the present invention, the occurrence of inrush current is detected by making use of a voltage drop due to the on resistance of the first switch, so that the detection of the inrush current can be realized without providing a resistance element for detection, that is, without causing a decrease in the power conversion efficiency of the switching regulator. Moreover, excessive current in the steady operation can be restrained in the same manner as the inrush current in the initial operation because the initial operation does not need to be controlled differently from in the steady operation.

Furthermore, it is possible to reduce the time required for the initialization by placing the second switch in the ON state for a predetermined time period while the first switch is in the OFF state.

What is claimed is:

1. A switching regulator of a synchronous rectifying mode comprising:

a first switch and a second switch arranged in series between a first power source which supplies a first potential and a second power source which supplies a second potential lower than the first potential, the first switch being positioned closer to the first power source than the second switch;

a switch control unit for controlling an on-off operation of the first and second switches; and a smoothing circuit for smoothing a potential of an output node between the first switch and the second switch, said switch control unit turning off the first switch when the potential of said output node is below a first reference potential which becomes a reference to detect an occurrence of inrush current or excessive current while the first switch is in an ON state, wherein the first reference potential is lower than the first potential and higher than the second potential.

2. A switching regulator of a synchronous rectifying mode comprising:

a first switch and a second switch arranged in series between a first power source which supplies a first potential and a second power source which supplies a second potential lower than the first potential, the first switch being positioned closer to the first power source than the second switch;

a switch control unit for controlling an on-off operation of the first and second switches; and a smoothing circuit for smoothing a potential of an output node between the first switch and the second switch, said switch control unit turning off the first switch when the potential of said output node is below a first reference potential which becomes a reference to detect an occurrence of inrush current or excessive current while the first switch is in an ON state, wherein said switch control unit comprises:

a first reference potential generating circuit for generating the first reference potential;

a first potential comparator for comparing the first reference potential generated by the first reference potential generating circuit with the potential of said output node; and an available period setting circuit for setting an available period during which comparison results of the first potential comparator is valid, said switch control unit turning off the first switch when the first potential comparator detects that the potential of said output node is below the first reference potential during said available period set by said available period setting circuit.

3. The switching regulator of claim 2, wherein said available period setting circuit sets a start of said available period at a time when a predetermined time period has elapsed since the first switch is turned on.

4. The switching regulator of claim 2, wherein after turning off the first switch, said switch control unit places the second switch in an ON state for a predetermined time period before the first switch is turned back on.

5. The switching regulator of claim 4, wherein said predetermined time period is set at a fixed time period.

6. The switching regulator of claim 4, wherein said predetermined time period is set variable in accordance with an output voltage of said smoothing circuit.

7. The switching regulator of claim 4, wherein said switch control unit turns off the second switch when the potential of said output node exceeds a second reference potential which becomes a reference to determine a termination of an ON-time period of the second switch while the second switch is in the ON state.

8. An LSI system comprising:

said switching regulator of claim 2, and an LSI core unit driven by a voltage supplied from said switching regulator.

9. A DC/DC converter comprising:

a first switch and a second switch arranged in series between a first power source which supplies a first potential and a second power source which supplies a second potential lower than the first potential, the first switch being positioned closer to the first power source than the second switch; and a switch control unit for controlling an on-off operation of the first and second switches;

said switch control unit turning off the first switch when the potential of an output node between the first switch and the second switch is below a first reference potential which becomes a reference to detect an occurrence of inrush current or excessive current while the first switch is in an ON state, wherein said switch control unit comprises:

a first reference potential generating circuit for generating the first reference potential;

a first potential comparator for comparing the first reference potential generated by the first reference potential generating circuit with the potential of said output node; and an available period setting circuit for setting an available period during which comparison results of the first potential comparator is valid, said switch control unit turning off the first switch when the first potential comparator detects that the potential of said output node is below the first reference potential during said available period set by said available period setting circuit.

* * * * *

UNITED STATES PATENT AND TRADEMARK OFFICE
CERTIFICATE OF CORRECTION

PATENT NO. : 6,307,360 B1
DATED : October 23, 2001
INVENTOR(S) : Jun Kajiwara et al.

Page 1 of 1

It is certified that error appears in the above-identified patent and that said Letters Patent is hereby corrected as shown below:

<u>Title page,</u>
Item [56] References Cited, under "FOREIGN PATENT DOCUMENTS" insert:

09-121546    05/06/97    Japan
    05-056636    03/05/93    Japan

Signed and Sealed this

Twenty-sixth Day of February, 2002

*Attest:*

JAMES E. ROGAN
*Attesting Officer*    *Director of the United States Patent and Trademark Office*